US010939675B1

(12) United States Patent
 Betker

(10) Patent No.: US 10,939,675 B1
(45) Date of Patent: Mar. 9, 2021

(54) TURKEY CALL DEVICE

(71) Applicant: Terry Franklin Betker, Yakima, WA (US)

(72) Inventor: Terry Franklin Betker, Yakima, WA (US)

( * ) Notice: Subject to any disclaimer, the term of this patent is extended or adjusted under 35 U.S.C. 154(b) by 0 days.

(21) Appl. No.: 16/735,953

(22) Filed: Jan. 7, 2020

(51) Int. Cl.
 *A01M 31/00* (2006.01)
 *G10K 3/00* (2006.01)
 *A63H 5/00* (2006.01)

(52) U.S. Cl.
 CPC .............. *A01M 31/006* (2013.01); *G10K 3/00* (2013.01)

(58) Field of Classification Search
 CPC ........ A01M 31/00; A01M 31/004; A63H 5/00
 USPC ............... 446/397, 402, 404, 408, 418, 489; 84/411 P, 410, 404, 402
 See application file for complete search history.

(56) References Cited

U.S. PATENT DOCUMENTS

| 5,529,526 | A | * | 6/1996 | Wesley | ............... | A01M 31/004 446/397 |
| 5,961,367 | A | | 10/1999 | Morris | | |
| 9,155,296 | B2 | * | 10/2015 | Moss | .................. | A01M 31/004 |
| 9,756,846 | B2 | | 9/2017 | Burcham | | |
| 10,085,440 | B1 | | 10/2018 | Williams | | |
| 2006/0046608 | A1 | * | 3/2006 | Moss | .................. | A01M 31/004 446/418 |
| 2006/0281388 | A1 | * | 12/2006 | Quarles | ............... | A01M 31/004 446/418 |
| 2010/0216371 | A1 | | 8/2010 | Cubbedge | | |
| 2011/0065356 | A1 | * | 3/2011 | Blodgett | ............. | A01M 31/004 446/397 |
| 2011/0201248 | A1 | * | 8/2011 | Bean | .................. | A01M 31/004 446/418 |
| 2014/0273727 | A1 | | 9/2014 | Huff | | |

* cited by examiner

*Primary Examiner* — Kien T Nguyen

(57) ABSTRACT

A turkey call device is disclosed in this invention. The turkey call device includes a striker that has a wedge-shape taper ending in a flat striking tip and a counter-balancer. The tip is made of a harder material than some of the materials in rest of the striker. The combination of elements enables this turkey call device to be easier to use and produce more consistent turkey-like sounds than conventional turkey call devices in the market today.

12 Claims, 5 Drawing Sheets

Side View

TURKEY CALL DEVICE

BACKGROUND

Field of the Invention

The present invention is related to a turkey call device, and more particularly, to a turkey call striker with a cylindrical rod having a wedge-shaped taper terminated to a flat striking tip at one end.

Description of Related Art

The use of animal calls is a popular way to attract animals, such as for hunting purposes. One type of animal calls makes sound from friction. An example friction call is a turkey call, which generates turkey-like sounds by dragging a striker against a friction plate.

Existing turkey call devices in the market usually includes a striker with a solid rod having a rounded tip and a slate that serves as a friction surface. It takes skills to generate a good sound from such turkey calls. It also requires practice to create a consistent sound from one strike to the next.

Therefore, a turkey call device which is easier to use and provides consistent turkey-like sounds is desired.

SUMMARY

This invention is directed to a turkey call device with a striker that has a wedge-shape taper ending in a flat striking tip. The tip is made of a harder material than some of the materials in rest of the striker. The combination of elements enables this turkey call device to be easier to use and produce a more consistent sound than conventional turkey call devices in the market today.

In one embodiment, the striker is constructed from an antler. Antler typically includes an outer material of subvelvet and compact bone, and an inner material of cancellous bone. This combination of materials makes an antler a particularly suitable material for this invention. The hardened outer material of the antler can be used for the tip of the striker while the inner material can be used for rest of the striker. In another embodiment, the friction plate of the turkey call device can also be constructed from an antler.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This invention is directed to a turkey call device with a striker that has a wedge-shape taper ending in a flat striking tip. The tip is made of a harder material than some of the materials in rest of the striker. The combination of elements enables this turkey call device to be easier to use and produce a more consistent sound than conventional turkey call devices in the market today.

Figure 1:
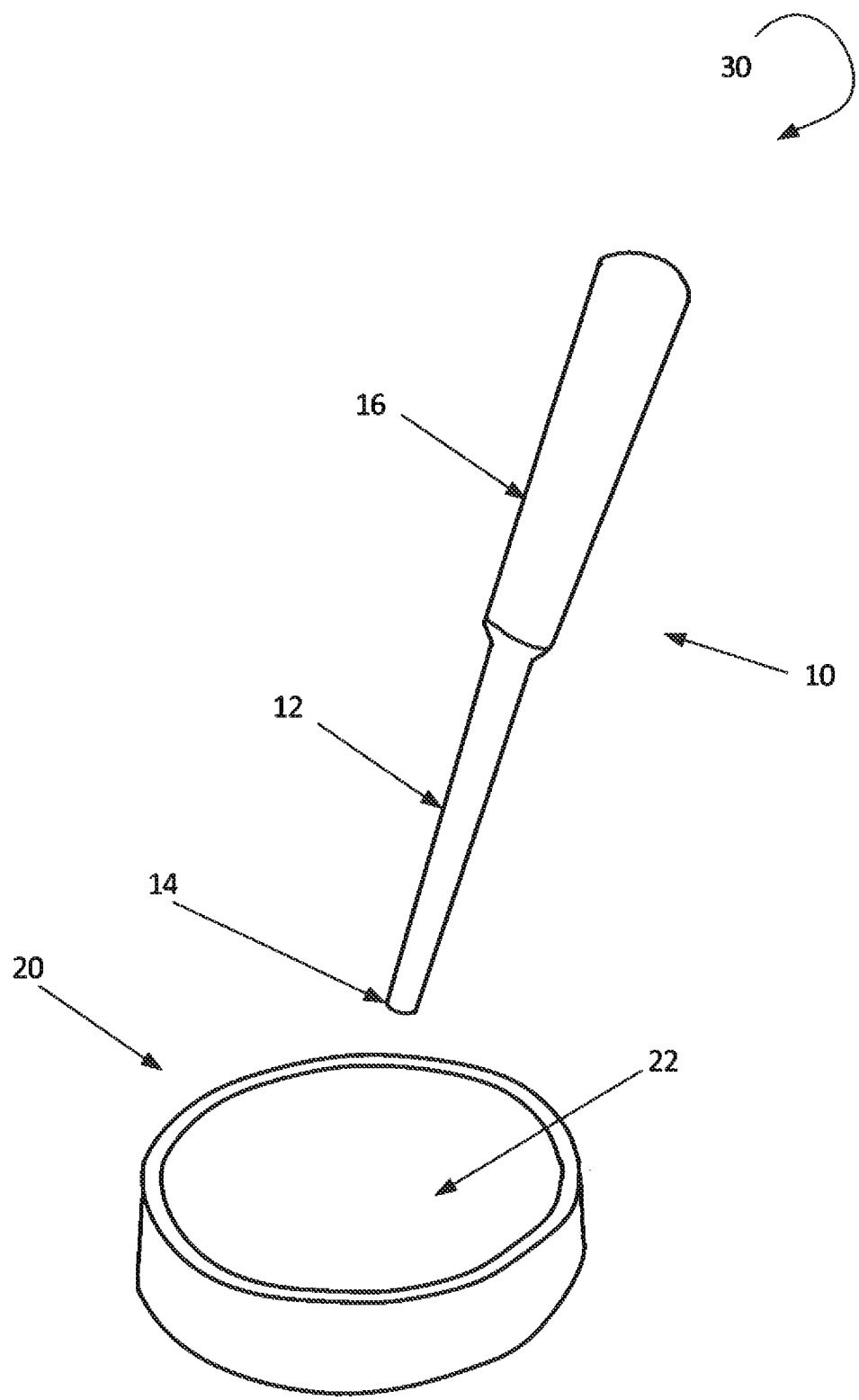
FIG. 1 is a display diagram illustrating an example of a turkey call device

As shown in FIG. 1, a turkey call device 30 includes a striker 10. The striker 10 comprises a cylindrical rod 12 with a flat striking tip 14 at one end and a counter-balancer 16. The turkey call device 30 may further include a friction plate 20 with a surface 22. FIG. 1 shows the striker 10 is in use with the friction place 20 to generate turkey-like sounds.

Figure 2A:
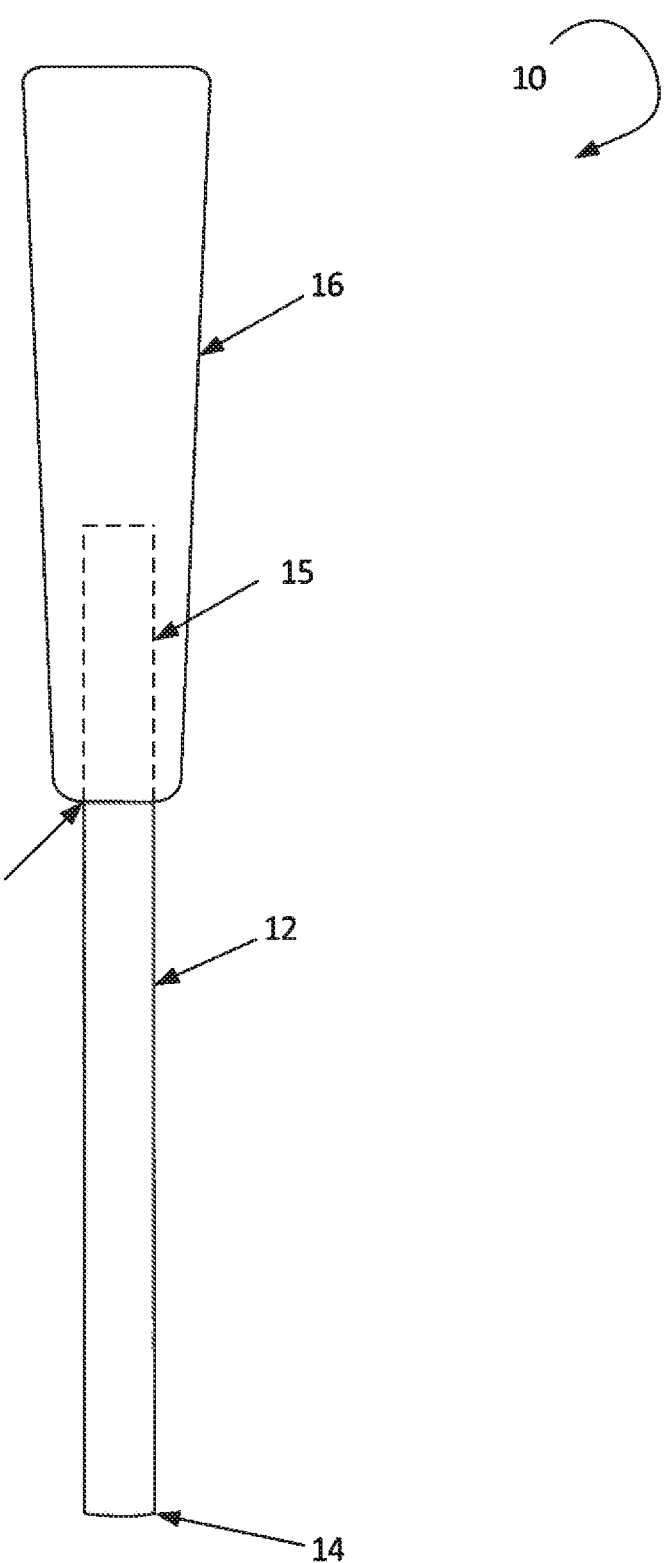
FIG. 2A is a display diagram illustrating an example of a turkey call striker with a front view.
Figure 2B:
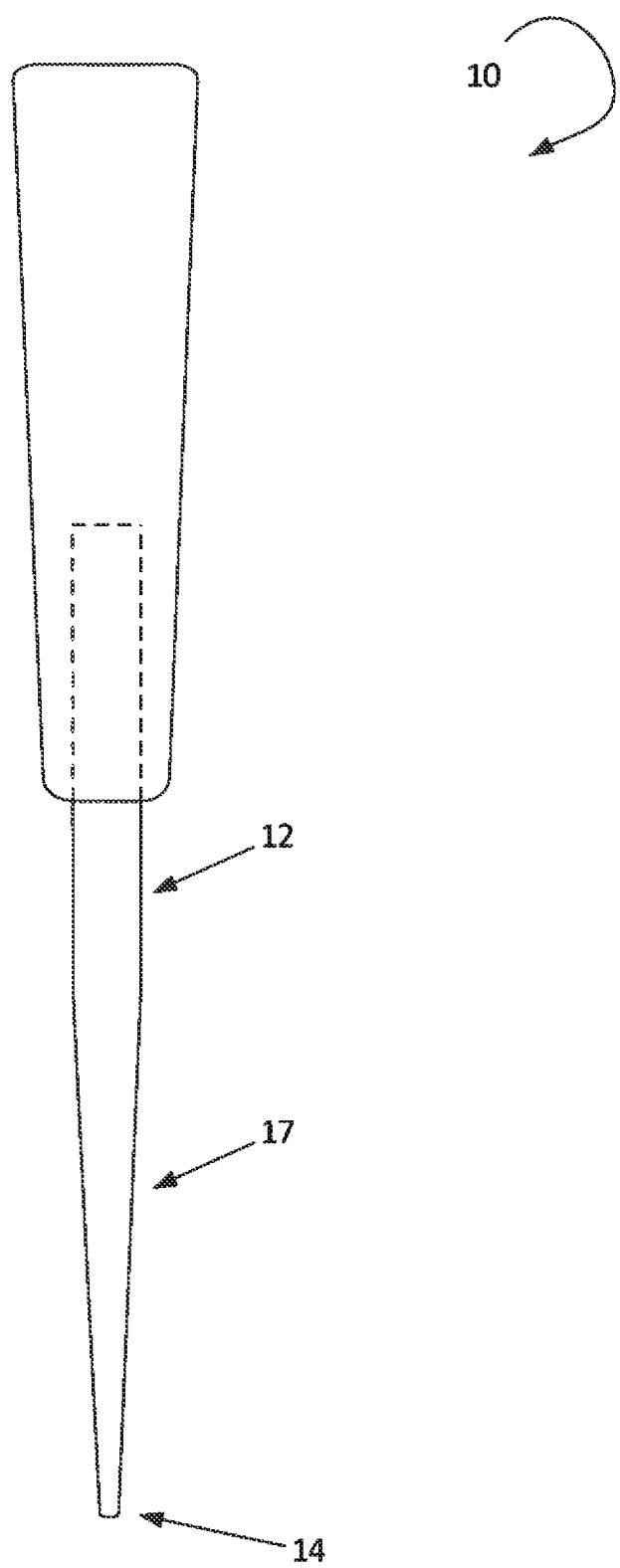
FIG. 2B is a display diagram illustrating an example of a turkey call striker with a side view.

As shown in FIGS. 2A & 2B, with a front view and a side view, a turkey call striker 10 includes a cylindrical rod 12 with a flat striking tip 14 at one end and an opposite end 15, and a counter-balancer 16 with an opening 18 at one end. The cylindrical rod 12 having a wedge-shaped taper 17 at one end. The wedge-shaped taper 17 can extend one-quarter to the entire length of the rod and terminates to the flat striking tip 14. The rod 12 can have a diameter of 0.01 to 0.10 times of a length of the rod. The flat striking tip 14 can have a width of between 0.2 to 1 inch and a thickness between 0.1 to 0.5 inches. In proportion, the flat striking tip 14 can have a width of 2 to 10 times of a thickness of the flat striking tip. The counter-balancer 16 can have a diameter of between 1.5 to 3 times a diameter of the rod 12. The opening 18 of the counter-balancer 16 is fastened to the end 15 of the rod 12. The counter-balancer can be fastened to one-quarter to three-quarter of the rod 12 at one end. The combination of the counter-balancer 16 and the rod 12 produces desired turkey-like sounds consistently while the striker 10 is dragged against the friction plate 20.

In one embodiment, a striker comprises a cylindrical rod, with a length of 4 inches and a diameter of 0.5 inches and a counter-balancer with a length of 3 inches and a diameter of 1 inch. The cylindrical rod has a wedge-shape taper which extends three-quarter of the length of the rod and terminates to a flat striking tip. The flat striking tip has a width of 0.3 inches and a thickness of 0.125 inches. The counter-balancer is fastened to the other end of the cylindrical rod.

Figure 3:
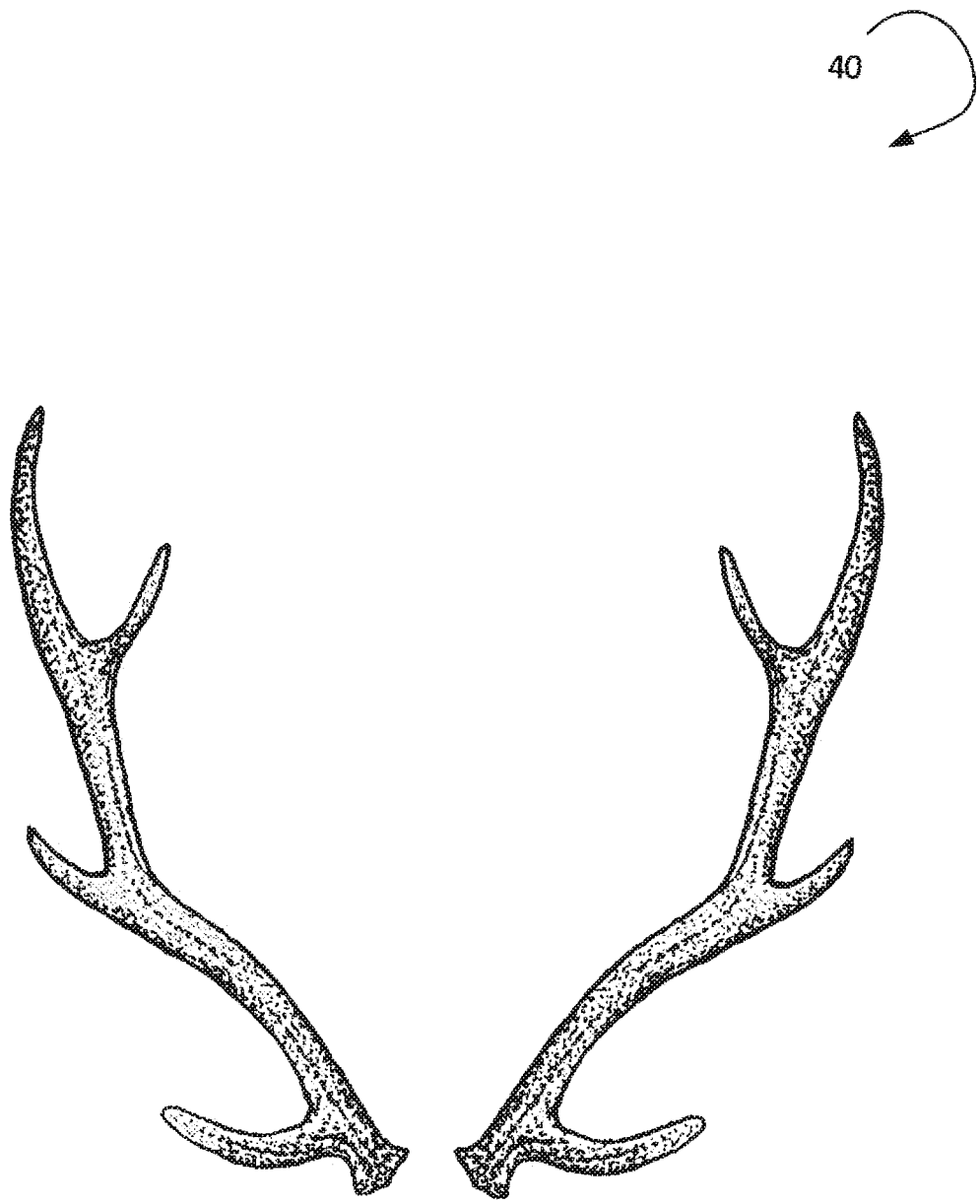
FIG. 3 is a display diagram illustrating of an antler.
Figure 4:
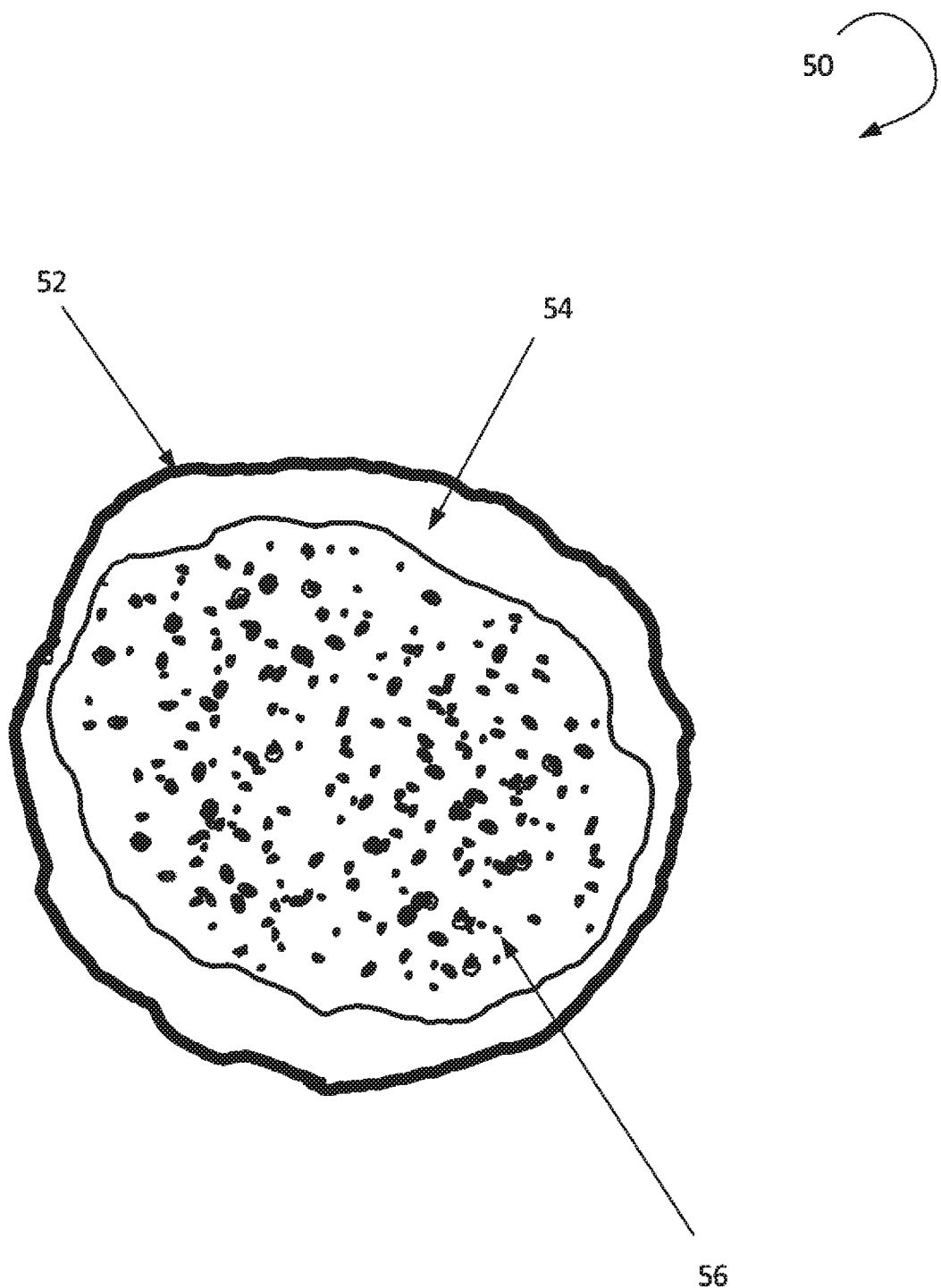
FIG. 4 is a display diagram illustrating a cross section of an antler.

An elk antler 40 is shown in FIG. 3, which can be used to construct striker 10. Other types of antlers can also be used. As shown in FIG. 4, an antler cross section 50 typically includes an outer material of subvelvet 52 and compact bone 54, and an inner material of cancellous bone 56. This combination of materials makes an antler a particularly suitable material for this invention. The hardened outer material of the antler, such as compact bone 54, can be used for the flat striking tip 14 of the striker 10 while the inner material 56 can be used for the rest of the rod 12 of the striker 10. In another embodiment, the rod 12, including the flat striking tip 14, is constructed from the hardened outer material of antler. In one embodiment, the flat striking tip 14 is constructed from the hardened outer material of compact bone 54, and the rest part of the rod 12 is constructed from both the outer material of antler, such as compact bone 54, and the inner material, such as cancellous bone 56. Yet in another embodiment, the rest of the rod 12, excluding the flat striking tip 14, is constructed from other suitable material which has similar or higher hardness of the inner material 56. In another embodiment, the flat striking tip 14 is constructed from other suitable material which has similar or higher hardness of the outer material 54. As an example, the rod 12, including the flat striking tip 14, can also be constructed from wood. As in another example, the flat striking tip 14 is constructed from a first material while the rest of the rod 12 is constructed from a second material which has the similar or lower hardness of the first material. A counter-balancer 16 can be constructed from an antler, wood, or other suitable materials.

As show in FIG. 1, in an embodiment, the friction plate 20 of the turkey call device can also be constructed from an elk antler 40 or other types of antlers. Surface 22 can be constructed in part from the outer material 54 of an antler while other parts of surface 22 can be any part of the antler, including the inner material 56 and the outer material 52 and 54. Furthermore, the friction plate 20 can be constructed from any other suitable material which has a surface with similar or higher hardness of the outer material 52 and 54, such as slate, glass, or metal.

In one embodiment, a turkey call device 30 can be constructed by following a particular process. The process comprises the steps of: providing an antler 40; cutting a section of the antler along a longitudinal axis of the antler 40; cutting the section into multiple lengthwise parts, wherein at least one end of the parts includes compact bone 54 of the antler, forming cylindrical rods from the lengthwise parts, wherein at least one end of each cylindrical rod includes compact bone 54 of the antler; cutting a wedge-shaped taper 17 at one end of at least one of the cylindrical rods with compact bone 54 of the antler, and forming a flat tip 14 at an end of the wedge-shaped taper 17 to create a flat striking tip 14 of a striker 10. In another embodiment, the process also includes sanding the flat tip 14 striking surface to achieve a level of friction such that a simulated turkey call sound is generated when the flat tip is dragged across a friction surface 22. In yet another embodiment, the process includes cutting another section from the antler 40 or from a second antler, the section having a surface, at least part of the surface being compact bone 54 of the antler, and forming a flat friction surface 22 of the section to create a friction surface for the striker 10.

In one embodiment, a turkey call striker 12 comprising a cylindrical rod 12 and a counter-balancer 16, the cylindrical rod 12 constructed from an antler 40 and having a wedge-shaped taper 17 at one end, the wedge-shaped taper 17 extending one-quarter to entire length of the rod 12 and terminating to a flat striking tip 14, the flat striking tip 14 being composed of compact bone 54 portion of the antler 40, the counter-balancer 16 being fastened to another end 15 of the cylindrical rod 12.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A turkey call device comprising:
    a striker comprising:
        a cylindrical rod having a wedge-shaped taper at one end, the wedge-shaped taper extending one-quarter to entire length of the rod and terminating to a flat striking tip, the flat striking tip being constructed from a first material, the cylindrical rod being also constructed from a second material with a hardness less than that of the first material, wherein the first material is compact bone of an elk antler and the second material is cancellous bone of the elk antler, wherein the hardness of the cancellous bone of the elk antler is less than that of the compact bone of the elk antler, and
        a counter-balancer fastened to one-quarter to three-quarter of the rod at another end of the rod.

2. The turkey call device of claim 1, wherein the rod has a diameter of 0.01 to 0.10 times of a length of the rod.

3. The turkey call device of claim 1, wherein the counter-balancer has a diameter of between 1.5 to 3 times a diameter of the rod.

4. The turkey call device of claim 1, wherein the flat striking tip has a width between 0.2 to 1 inch.

5. The turkey call device of claim 1, wherein the flat striking tip has a thickness between 0.1 to 0.5 inch.

6. The turkey call device of claim 1, wherein the counter-balancer is constructed from the first material and the second material.

7. The turkey call device of claim 1, further comprising a friction plate having a striking surface constructed from the elk antler.

8. The turkey call device of claim 7, wherein at least part of the striking surface is constructed from compact bone of the elk antler.

9. A turkey call striker comprising a cylindrical rod and a counter-balancer, the cylindrical rod constructed from an elk antler and having a wedge-shaped taper at one end, the wedge-shaped taper extending one-quarter to entire length of the rod and terminating to a flat striking tip, the flat striking tip being composed of compact bone portion of the elk antler, the cylindrical rod being composed in part of cancellous bone of the elk antler, wherein the cancellous bone of the elk antler has a lower hardness than that of the compact bone portion of the elk antler, the counter-balancer being fastened to another end of the cylindrical rod.

10. A turkey call device by a process comprising the steps of:
    providing an elk antler;
    cutting a section of the antler along a longitudinal axis of the elk antler;
    cutting the section into multiple lengthwise parts, wherein at least one end of the parts includes compact bone of the elk antler;
    forming cylindrical rods from the lengthwise parts, wherein at least one end of each cylindrical rod includes compact bone of the elk antler;
    cutting a wedge-shaped taper at one end of at least one of the cylindrical rods with compact bone of the elk antler; and
    forming a flat tip at an end of the wedge-shaped taper to create a flat striking tip of a striker.

11. The turkey call device of claim 10, wherein the process further comprising the steps of sanding the flat tip striking surface to achieve a level of friction such that a simulated turkey call sound is generated when the flat tip is dragged across a friction surface.

12. The turkey call device of claim 10, wherein the process further comprising the steps of:
    cutting another section from the elk antler or from a second elk antler, the section having a surface, at least part of the surface being compact bone of the elk antler; and
    forming a flat friction surface of the section to create a friction surface for the striker.

* * * * *